(12) United States Patent
Lobbestael et al.

(10) Patent No.: US 8,668,101 B2
(45) Date of Patent: Mar. 11, 2014

(54) METHOD AND APPARATUS FOR MAKING A LIGHT WEIGHT CONTAINER

(75) Inventors: Peter Lobbestael, Manitou Beach, MI (US); Al Vanover, Adrian, MI (US); Kevin D Gaydosh, Adrian, MI (US); Gregory T Hall, Adrian, MI (US)

(73) Assignee: Mid-America Machining, Inc., Brooklyn, MI (US)

( * ) Notice: Subject to any disclaimer, the term of this patent is extended or adjusted under 35 U.S.C. 154(b) by 0 days.

(21) Appl. No.: 13/405,495

(22) Filed: Feb. 27, 2012

(65) Prior Publication Data

US 2012/0241405 A1    Sep. 27, 2012

Related U.S. Application Data

(60) Provisional application No. 61/466,588, filed on Mar. 23, 2011.

(51) Int. Cl.
*B65D 90/02* (2006.01)
*B65D 8/04* (2006.01)
*B65D 1/02* (2006.01)

(52) U.S. Cl.
CPC .............. *B65D 1/0223* (2013.01); *B65D 1/02* (2013.01); *B65D 2501/0081* (2013.01)
USPC ............................. 215/382; 220/675; 220/669

(58) Field of Classification Search
CPC ................ B65D 1/0223; B65D 1/02; B65D 2501/0081; B65D 2501/0009
USPC .............. 215/382, 40, 10, 379; 220/675, 669, 220/660; 206/509, 507, 505; D9/567, 520
IPC ................................................ B65D 90/02,8/04
See application file for complete search history.

(56) References Cited

U.S. PATENT DOCUMENTS

| | | | |
|---|---|---|---|
| D205,730 S * | 9/1966 | Platte | D9/531 |
| 3,708,082 A * | 1/1973 | Platte | 215/385 |
| 3,765,574 A | 10/1973 | Urquiza | |
| 4,016,995 A * | 4/1977 | Frazer | 215/10 |
| 4,372,455 A * | 2/1983 | Cochran | 215/385 |
| 4,805,793 A | 2/1989 | Brandt et al. | |
| D307,389 S * | 4/1990 | Larson | D9/520 |
| 5,087,406 A | 2/1992 | Krall et al. | |
| 5,112,561 A * | 5/1992 | Dickinson | 264/531 |
| 5,803,290 A * | 9/1998 | Bongiorno | 215/384 |
| 5,833,115 A * | 11/1998 | Eiten | 220/669 |
| 6,065,624 A * | 5/2000 | Steinke | 215/383 |
| 6,237,792 B1 | 5/2001 | Skolnicki et al. | |
| 6,527,133 B1 | 3/2003 | McCollum et al. | |
| 6,540,956 B1 | 4/2003 | Iwamoto et al. | |
| 2003/0155324 A1* | 8/2003 | McCollum et al. | 215/382 |

(Continued)

FOREIGN PATENT DOCUMENTS

GB    2464386    9/2010
GB    2470316    11/2010

*Primary Examiner* — Robert J Hicks
(74) *Attorney, Agent, or Firm* — Young Basile Hanlon & MacFarlane P.C.

(57) ABSTRACT

An improved lightweight container incorporates a thinner wall structure in an essentially octagonal container having a bottom member, a plurality of sidewalls, a spout, an upwardly converging neck member coupling the sidewalls of the spout, a handle molded into the container and a radiused transiting section between the sidewalls and the spout which eliminates weakened corner sections and improves overall strength to weight ratios.

20 Claims, 7 Drawing Sheets

(56) References Cited

U.S. PATENT DOCUMENTS

| | | |
|---|---|---|
| 2003/0234236 A1 | 12/2003 | Michalowski |
| 2004/0164048 A1* | 8/2004 | Yourist .................. 215/398 |
| 2006/0096942 A1 | 5/2006 | Lane |
| 2006/0255000 A1 | 11/2006 | Quitana |
| 2006/0260971 A1 | 11/2006 | Rivera et al. |
| 2007/0221606 A1 | 9/2007 | Eiten et al. |
| 2007/0235905 A1* | 10/2007 | Trude et al. ................... 264/523 |
| 2008/0217200 A1 | 9/2008 | Eiten et al. |
| 2009/0294400 A1 | 12/2009 | Sasaki et al. |
| 2010/0151163 A1 | 6/2010 | Skov |
| 2011/0056903 A1 | 3/2011 | Glover |

* cited by examiner

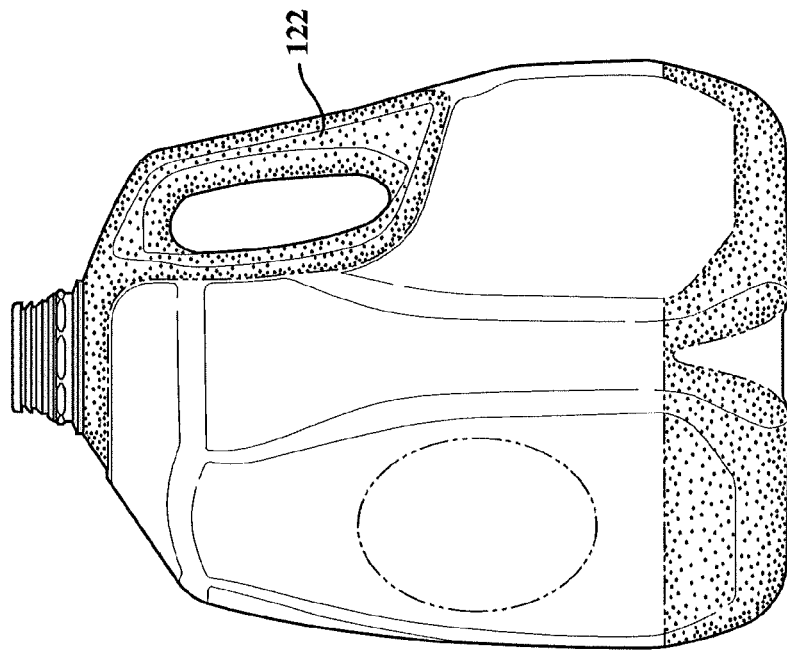
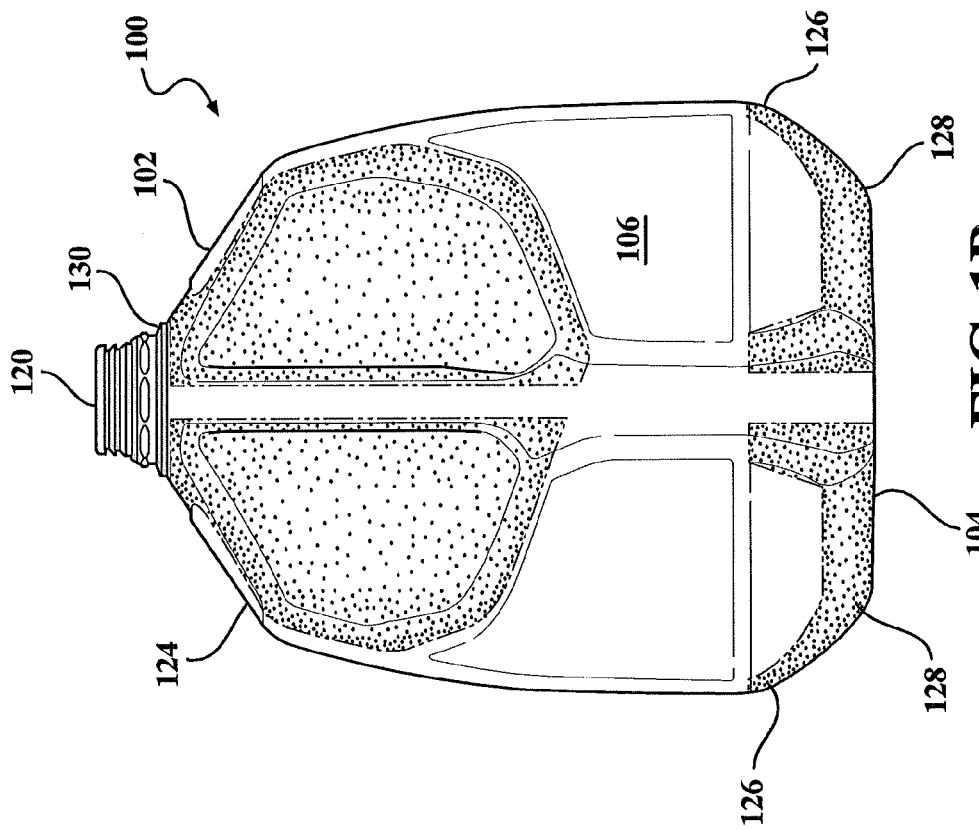
FIG. 1C
PRIOR ART
FIG. 1B
PRIOR ART

METHOD AND APPARATUS FOR MAKING A LIGHT WEIGHT CONTAINER

RELATED U.S. APPLICATION

This application claims the benefit of U.S. Provisional Application No. 61/466,588 filed Mar. 23, 2011.

FIELD OF THE INVENTION

The present invention relates to containers for storage of liquids, granular materials and the like, and methods and apparatuses for forming the same. More particularly, the container of the present invention is a single piece blow-molded plastic container formed in a multi-sided configuration with modified corner radii, utilizing a smaller volume of raw material to obtain volumes and strength equivalent to the prior art.

DESCRIPTION OF THE RELATED ART

Blow-molded plastic bottles are well known for use for holding a wide variety of liquids such as milk, water and juice. The same types of containers may be used for granular materials. Containers of this type are manufactured in a variety of sizes, conventionally formed of a variety of thermoplastic materials.

Typical of these containers are those disclosed in U.S. Pat. No. 6,527,133, issued to McCollum et al.; U.S. Pat. No. 4,805,793, issued to Brandt et al.; and U.S. Pat. No. 6,237,792, issued to Skolnicki et al.

Containers of this type are relatively thin-walled, and are generally square or rectangular in cross-section, feature a molded handle, and typically have a finished weight of over 60 grams. Such weight of material is essential to maintaining sufficient strength for the container to withstand the industrial filling process, in particular, the loads imposed for securement of a closure, such as a cap, lid or screw top to the spout on the top of the container. FIGS. 1A, 1B, 1C and 1D show top, front, side and bottom views, respectively of blow-molded containers formed according to the prior art. The typical prior art container is depicted in FIGS. 1A-1D incorporates a top 102, a bottom 104 and spout 120. Top 102 and bottom 104 are interconnected by sidewalls 106, and includes a handle 122. In the prior art, a relatively acute transition occurs at the top corner 130 of the top 102 of the container, where the top 102 joins the lower circumference of the spout 120. Then, when the top 102 joins the sidewall 106, a second relative abrupt transition occurs at upper corner 124, generating a comparatively sharp angle between the top 102 and the sidewall 106. Transitioning to the bottom section of the prior art container, a first intermediate corner 126 creates a first transition between the sidewall 106 and the bottom 128 of the container. A bottom corner 128 completes the transition between the sidewall 106 and bottom 104. The combination of the corner transitions at intermediate corner 126 and bottom 128, coupled with the substantial distance between intermediate corners 126 and 128 demand a substantial distribution of material to the bottom section of the container to provide the necessary strength. The same problem is evident at the top of the container 102, where the top 102 of the container joins the sidewall 106 at upper corner 124. These multiple spaced apart transitions often result in excessively thin walls at the transitions, thereby weakening the container.

More recently, containers have been created which incorporate ribs and other design features in the upper sidewalls of the container to increase mechanical strength, well at the same time decreasing the wall thickness of the finished container. By reducing the overall thickness of the container, substantial savings in materials cost can be realized. Newer containers utilizing these design methodologies have resulted in reductions in material required for each container, and corresponding reductions in material cost, of between five and seven percent. Such reductions in the typical production environment can result in substantial cost savings over time.

The existing containers, however, suffer from important limitations. Particularly, as known in the prior art, the manufacture of thin-walled thermoplastic containers utilizing the blow-molding techniques can create unacceptably thin wall dimensions near the top and bottom of the containers, where the tops and bottoms of the containers join the side walls. Excessive thinning in these areas weakens the overall container and reduces its ability to withstand the forces typically imposed during the filling process. To insure that sufficient wall thickness remains in these vital sections, the current containers require a minimum of approximately fifty-eight to sixty grams in weight. A need exists, therefore, for a container design and method of manufacture, which permits more even distribution of thermoplastic material throughout the wall of the container, while allowing significant reductions in the amount of material required to produce the container.

SUMMARY OF THE INVENTION

In summary, a thin-walled container in accordance with the present invention is formed having sidewalls, a bottom, a top having a neck, a handle, and a spout. The container has eight sides, and a smoothly tapered radius between the spout and the sidewall. To form the container, specialized round tooling is utilized in the die and its associated mandrel to achieve more even distribution of the thermoplastic material during the molding process. The resulting container displays a more efficient distribution of the materials along the sidewalls, top and bottom of the container, typically at a weight of fifty-two grams or less.

It is an object of the present invention, therefore, to provide a thin-walled container having an extremely light weight. Further, it is an object of the present invention to provide a thin-walled container having six or more sides and a specially radiused transition between the spout and sidewall of the container.

It is another object of the present invention to position the handle of the container to improve venting of the interior of the container during the pouring process.

It is another object of the present invention to provide a system for manufacturing the same volume of container as taught in the prior art, while maintaining the necessary structural integrity of the container to withstand the industrial filling process.

It is a further object of the present invention to provide and improved container having the same volume and fitting in the same standard case as taught in the prior art.

These, and other objects of the invention, will be apparent from the associated drawings and description.

BRIEF DESCRIPTION OF THE DRAWINGS

FIG. 1B is a front view of a prior art container, constructed according to the methods of the prior art.

FIG. 1C is a side view of a prior art container, constructed according to the methods of the prior art.

DESCRIPTION OF THE PREFERRED EMBODIMENT

Figure 1A:
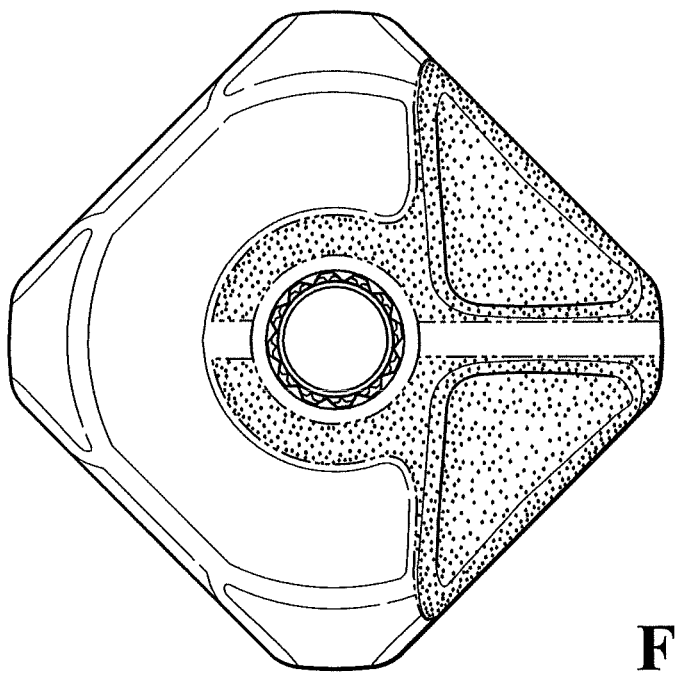
FIG. 1A us a top view of a prior art container, constructed according to the methods of the prior art.
Figure 1D:
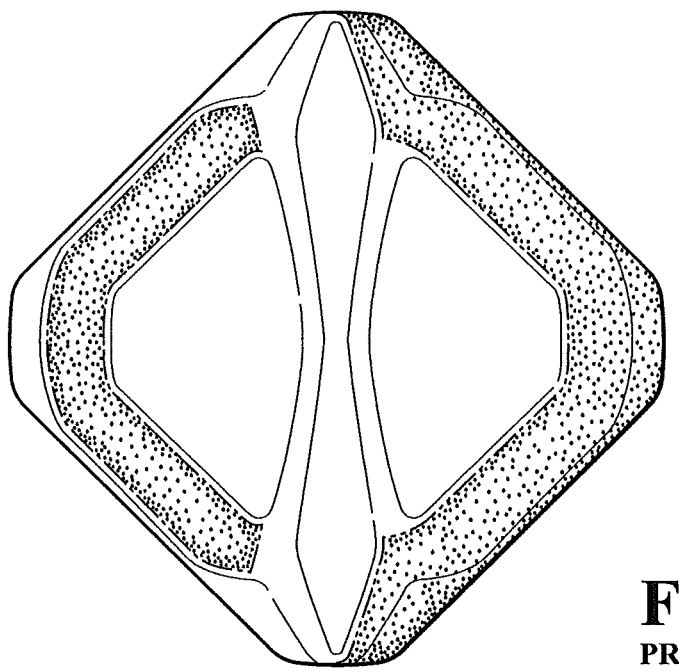
FIG. 1D is a bottom view of a prior art container, constructed according to the methods of the prior art.

The description which follows will be best appreciated by reference to the accompanying drawings. Although the invention is described in conjunction with the drawings, and a plurality of preferred embodiments is described, it will be appreciated that these descriptions are not intended to limit the invention to those embodiments. The invention includes a variety of alternatives, modifications and equivalents which may be included within the spirit and scope of the invention as defined by the appended claims.

The invention will be better understood by a full appreciation of the process of manufacture typically used in the art. A conventional blow-molding machine includes a loading station where pelletized thermoplastic material, such as polyethylene, may be introduced into a hopper or feed bin. The hopper, in turn, feeds the pelletized or granular thermoplastic materials, which is at room temperature, to a heater/drive system. Such a system typically includes a screw drive provided with one or more heating mechanisms or elements which gradually raise the temperature of the thermoplastic material to approximately 365° F. Once the material has attained this temperature, the material liquefies and becomes taffy-like in its consistency. The material is then introduced into the mold through a die and mandrel combination, whereby the thermoplastic material is evenly distributed in the mold. The blob of thermoplastic material which forms as it is extruded through the gauged opening between the die and mandrel is called a parison. Once the parison is formed the mold is closed around the parison possibly imparting the general shape of the interior of the mold onto the parison. This aids in distributing the material of the parison evenly throughout the interior of the mold when the mold is pressurized. The mold is then pressurized via the blow pin thereby forcing the parison to expand throughout the interior of the walls of the mold, and imparting to the material the finished shape of a container. To facilitate the molding process, the mold walls are cooled to approximately 30° to 40° F., to restore the liquefied thermoplastic material to solid state. Once the part has formed, the mold is opened and the part is removed from the mold.

Turning now to FIGS. 2A-2E, a first embodiment of a container formed according to the present invention is disclosed. Container 10 consists of a top section 12, a bottom 14 and a plurality of sidewalls. Eight sidewalls alternate in dimension, four being long sidewalls 16 and four being short sidewalls 18. The top section 12 is configured with a spout 20 having an opening 21 by which material may be introduced into the interior of the container 10. The container is molded as a single piece, and includes a handle 22 which is hollow and permits liquid and air to pass inside it. Preferably, the handle is configured adjacent to a short sidewall 18, so that when the container is held for pouring, the center of mass is concentrated along the axis which intersects both the handle and the opposing short sidewall of the container.

In a first embodiment, the height of the container 10 is measured from the bottom of the container to the bottom of the spout is approximately 9.231 inches, for a container having a volume of approximately 234 cubic inches, essentially a one-gallon container. In this embodiment, a radius transition 24 is formed between the upper limit of the sidewalls 16, 18 and spout 20. Preferably, the radius R has a dimension of approximately three inches, thereby providing a smooth transition between the sidewalls 16, 18 and spout 20 of the container 10 in comparison to the prior art. This area of transition may include one or more ribs 28 to provide additional strength to the container. The container 10 is blow-molded, and includes a single piece thin wall construction. The sidewalls, when viewed from above, form a generally octagonal configuration as seen in top or bottom plan views. The container 10 includes a bottom 14 which is interconnected to the sidewalls 16 and 18 and has a plurality of ribs 30. In one example, the radius transition 24 in between the sidewalls 16, 18 and the spout 20 has a radius of approximately 3" and a transition section length of about 2.5" in a container having an overall height of approximately 10".

Figure 3B:
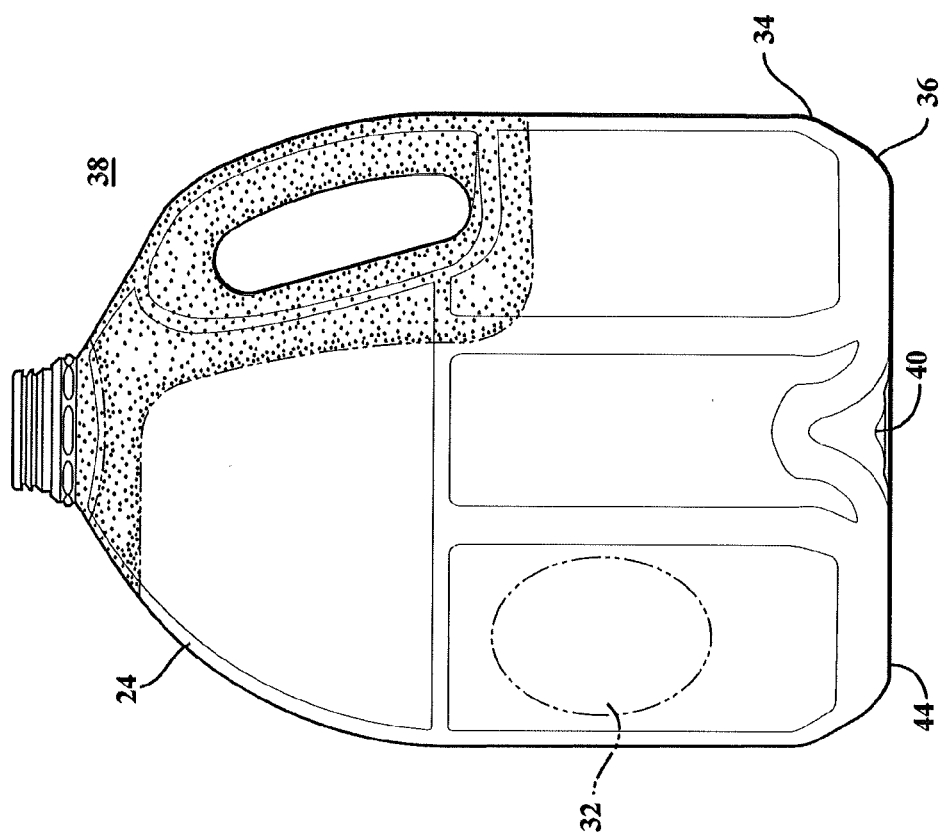
FIG. 3B is a side view of another embodiment of the present invention.
Figure 3A:
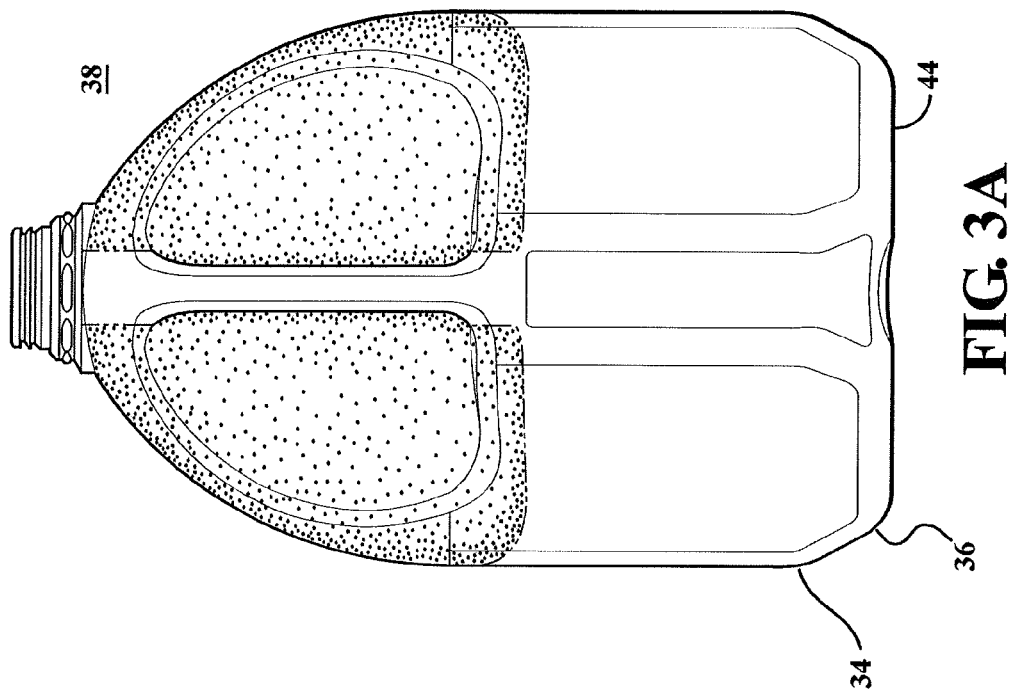
FIG. 3A is a front view of the present invention.

A second embodiment of the invention as disclosed in FIGS. 3A and 3B, which does not include the ribs 30 but does include the same upper radius transition 24. Containers of either configuration may be formed with one or more volume control inserts 32 molded into one or more sides of the container to adjust the total internal volume of the container 10.

Turning now to first embodiment of the invention as shown in FIGS. 2A-E, it will be appreciated that the top section 12 of the container 10 incorporates an upper radius transition of radius R between the bottom of the spout 20 and the top of sidewalls 16 and 18. The absence of the sharp transitions between the bottom of the spout and the container top, and the top of the sidewall in the container top results in increased strength while allowing for even distribution of the thermoplastic material, eliminating the sharp transitions of the prior art. The inclusion of rib 28 imparts additional strength to this vital section of the container.

Figure 2A:
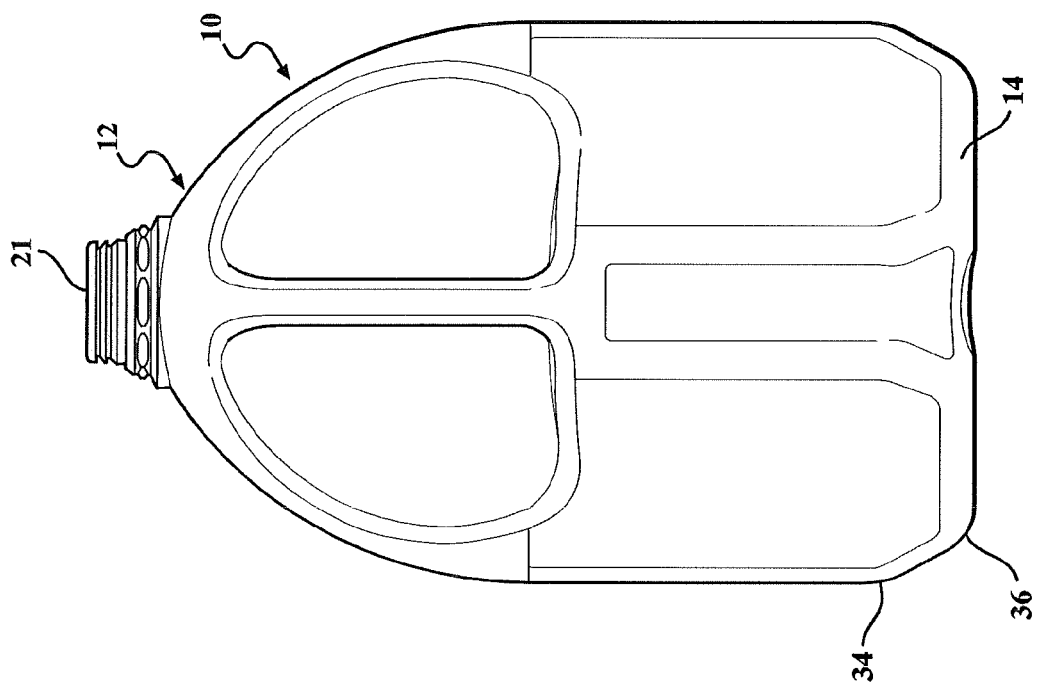
FIG. 2A is a front view of a first embodiment of the present invention.
Figure 2B:
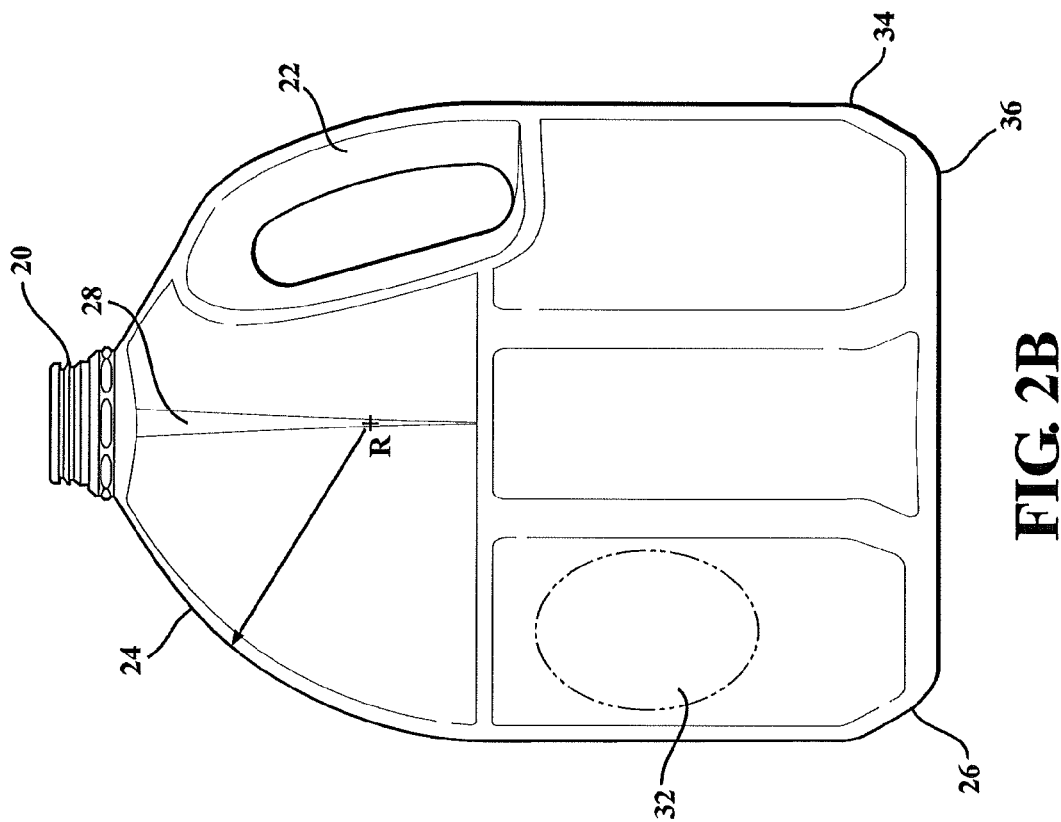
FIG. 2B is a side view of a first embodiment of the present invention.
Figure 2D:
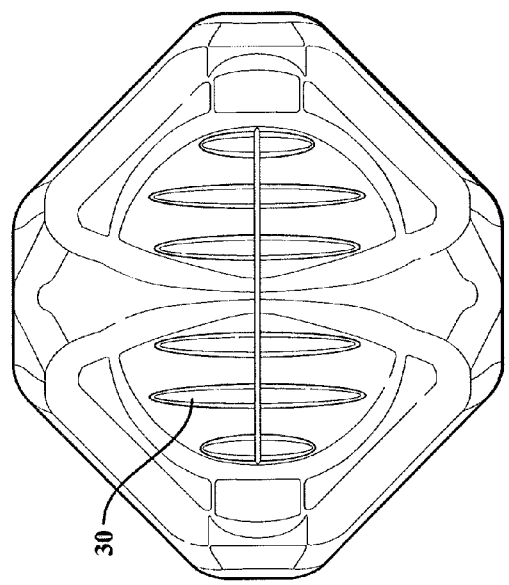
FIG. 2D is an alternate bottom view of a current embodiment of the present invention.
Figure 2E:
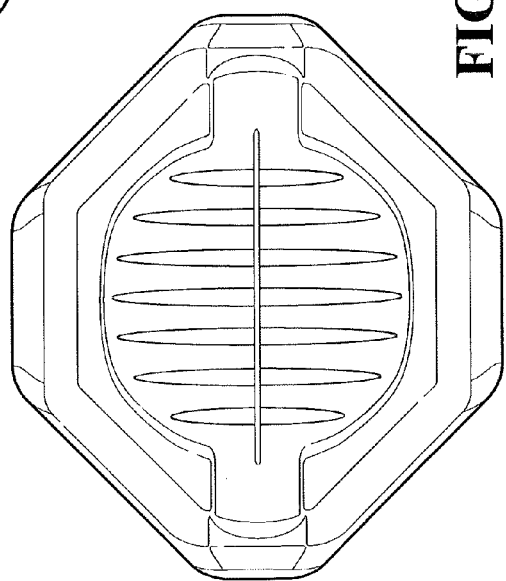
FIG. 2E is an additional bottom view of another variant of a current embodiment of the present invention.
Figure 2C:
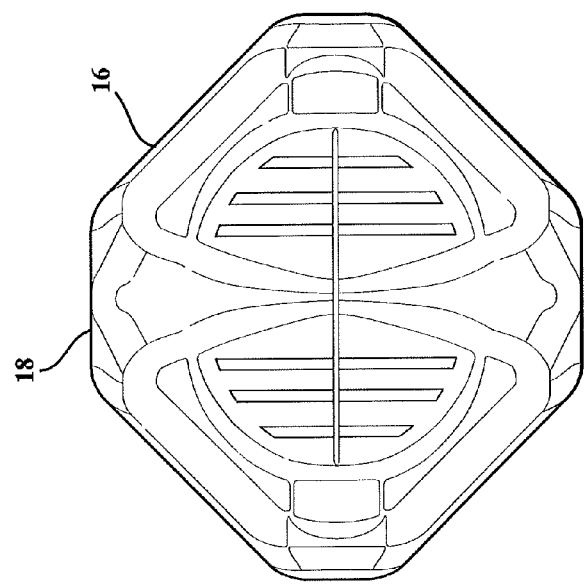
FIG. 2C is a bottom view of a first embodiment of the present invention.

Likewise, the intermediate corners 34 and bottom corners 36 are positioned closer than the corresponding transition corners in the prior art, resulting in a more even distribution of the thermoplastic material at those critical locations. As shown in FIGS. 2C-2E, a variety of methods may be adopted for placement of strengthening ribs 30 on the bottom of the container to impart a higher degree of rigidity, utilizing a thinner bottom wall section than required by the prior art. A variety of planiforms may be selected as depicted in FIGS. 2C-2E, each of which forms the desired function of imparting the necessary strength to the bottom of the container.

FIGS. 3A-3D show a second embodiment of the invention, where the bottom 44 of the container 38 is provided with a plurality of impressions 40, 42 which may facilitate stacking of containers 38. FIGS. 3A, B, C and D show a first side view, a second side view, a top view and a bottom view, respectively of an embodiment of the invention showing impressions 40, 42 cast into the bottom 44 of container 38.

Figure 3C:
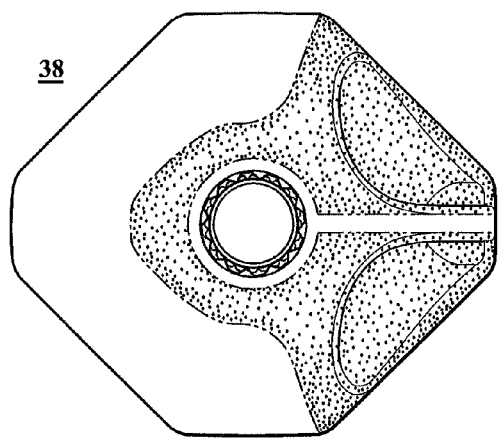
FIG. 3C is a top view of another embodiment of the present invention.
Figure 3D:
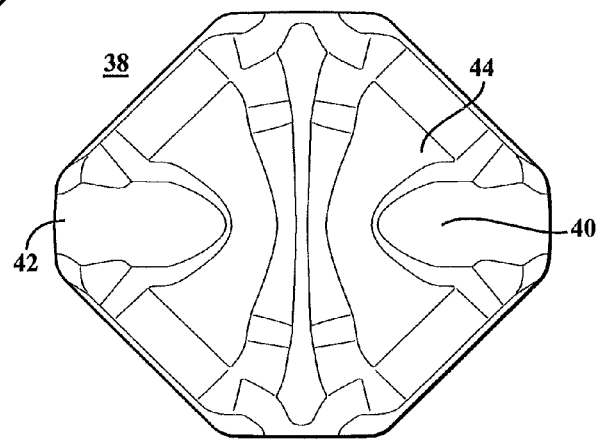
FIG. 3D is a bottom view of another embodiment of the present invention.

It will be further appreciated that additional strength may be obtained by multiplying the number of sidewalls as shown in FIGS. 2C and 3C. In each of the embodiments therein depicted, it will be appreciated that the container has eight sidewalls. The utilization of multiple sidewalls decreases the angles between the sidewalls, and the gentler radiuses therein incorporated allows for more even distribution of the thermoplastic material during the molding process. Embodiments of this disclosure have sidewalls arranged as opposing pairs where the distance between pairs of sidewalls is arranged so that two pairs of sidewalls are separated by a first distance and a third pair of sidewalls are separated by a second distance. The ratio of the first distance to the second distance is between about 1:1 to about 1:1.10, with the preferred ratio equal to about 1:1.06.

A further advantage of incorporation of the upper radius transition 24 is the improved pouring characteristics of the container. In a prior art, the sharp transitions between the top of the container and the spout and the upper part of the handle and the top of the container results in periodic difficulty in pouring from the container as liquid blocks movement of the contents of the container away from the handle, causing the contents of the container to pour in spurts, rather than in a continuous stream as air is admitted past the liquid. By utilization of the extended upper radius transition of the present invention, the contents of the container flow easily. In addition, the handle section is designed to be hollow and allow air to escape during poring due to its proximity to the spout to thereby mitigate splashing as liquid is pored from the container. It is also noted that the curved nature of the upper radius transition between the sidewalls and the spout permits the handle to be attached higher on the container proximate to the spout and have a smaller hole between the handle and the container, thereby improving the pouring characteristics as mentioned above and permitting the container to contain a greater volume of material.

Figure 4:
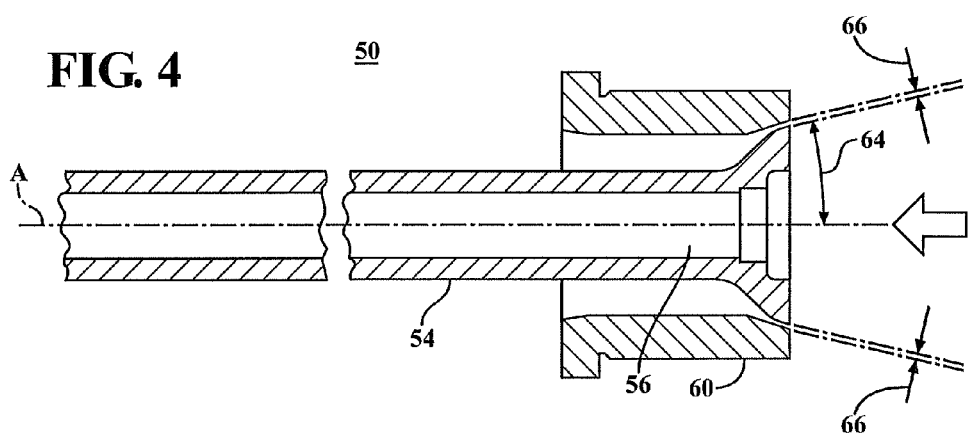
FIG. 4 is a diagram showing a die and mandrel according to an embodiment of the present invention.

Improved characteristics of containers produced according to embodiments of this invention are due at least in part to improvements to the equipment used to produce the containers, in particular the die and mandrel combination and the shape and size of the mold. FIG. 4 shows a cross-sectional view of an extrusion mechanism 50 according to an embodiment of this invention. This extrusion mechanism 50 operates as part of a blow molding machine, where the extrusion mechanism 50 positions a circular mandrel 54 having an air passage 56 in a circular die 60 so that a predetermined die gap 66 exists between the mandrel 54 and the die 60 a predetermined die angle 64. Thermoplastic material is forced into the extrusion mechanism 50 in the direction indicated by arrow "A", flows around the mandrel 54 and through the die gap 66 to form a parison. A parison is typically a hollow tube or bulb of semi-molten material which extends past the mandrel into the volume which will be the cavity of the mold. Once the desired parison is created, the mold (not shown) closes around the parison so that air can be introduced into the air passage 56 to inflate the parison to fill the enclosing mold. The size and shape of the die angle 64 and die gap 66 with respect to the mandrel 54 can determine the exact proportions of the parison. In this case the die 60 and mandrel 54 are both circular. The first parameter is the die angle 64 which measures the angle of the die 60 with respect to the mandrel 54. Die angles 64 can range from 0° to 30° or more particularly about 15°-18°. Using a die angle 64 of less than 30° allows the die gap 66 to be smaller. In the case of one gallon containers, a die gap 66 of between about 0.001" and about 0.025" or more particularly about 0.006" produces a parison with the desired shape and size when the appropriate amount of material is forced through the die/mandrel combination.

Figure 5:
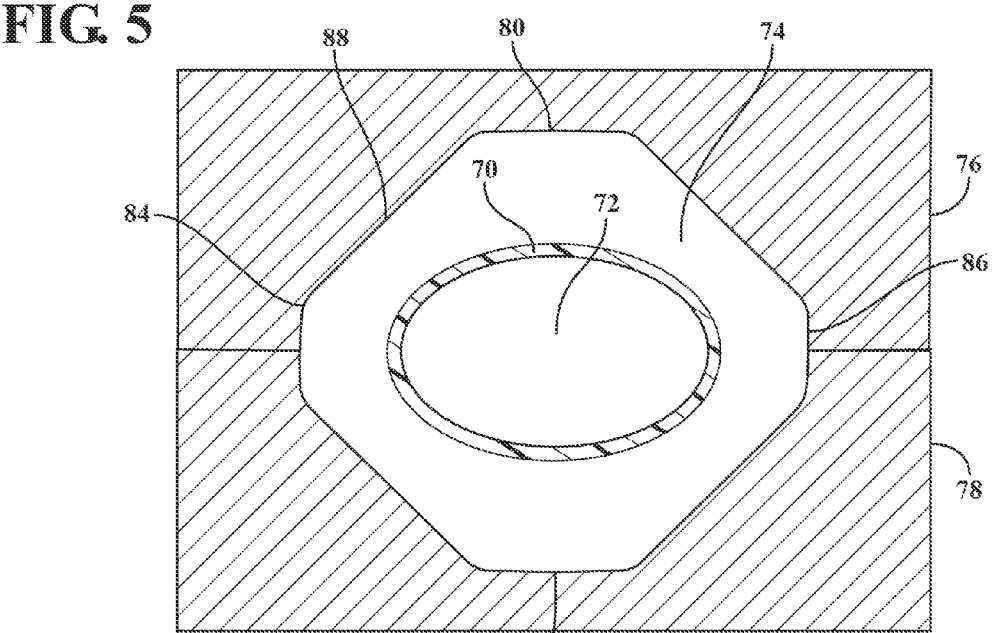
FIG. 5 is a diagram showing a parison and a mold according to an embodiment of the present invention.

In addition to the shape due to the die angle 64 and die gap 66, as shown in FIG. 5, a parison can change shape when the mold is closed. FIG. 5 shows a cross-sectional view of a parison 70 with a hollow core 72 inside a mold cavity 74 formed by the two parts of a two-part mold 76, 78 according to an embodiment of this invention. The parison 70 has elongated and formed an elliptical shape following closure of the mold halves 76, 78. Embodiments of this invention use the elliptical shape of the parison 70 in combination with improved design of the mold cavity 74 to improve the quality of the finished container. By forming a container with an elongated or diamond shape, shown in FIG. 5, the walls of the mold 88 can be kept at a substantially small similar distance from the parison 70. Replacing corners with short sidewall sections 80, 82, 84 and 86 and shaping the mold to mirror the shape of the parison improves the structural rigidity of the resulting blow molded container while maintaining overall container strength using less material. In addition, this design helps to avoid dented corners as the resulting container is used, thereby enhancing its appearance. The elongated parison 70 fits the mold cavity 74 more closely than a mold cavity having four symmetric sides. Shaping the interior of the mold to form an elongated shape similar to the parison 70, where the distance from the parison to the mold wall 88 is substantially equal causes the parison 70 to mold to the interior shape of the mold when the interior of the parison is pressurized. Having the interior of the mold closely mirror the elongate shape of the parison will provide the strongest container for the least amount of material by distributing the material evenly and thereby providing uniform wall thickness. Typical gallon containers manufactured by blow molding can use a minimum of 58 grams of thermoplastic material to form successfully, with 61-64 grams being typical in manufacturing operations. Embodiments of this invention can manufacture gallon containers with desirable strength and appearance using less than about 55 grams of thermoplastic materials, or more preferably less than about 52 grams of thermoplastic material.

Figure 6:
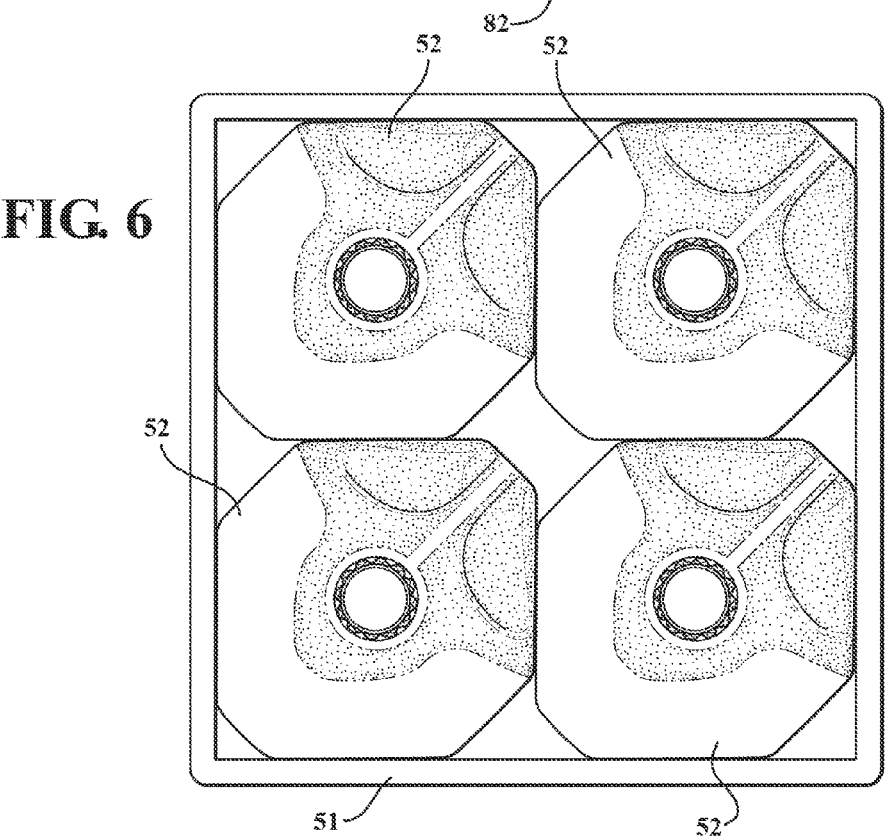
FIG. 6 is a top view of embodiments of the present invention held in a standard dairy crate.

FIG. 6 shows a top view of embodiments of this invention held in a standard dairy crate. Dairy crates are cases constructed to hold multiple containers so that dairy crates with full containers may be stacked without damage to the containers or contents. Dairy crates are manufactured in standard configurations and it is an advantage of embodiments of this invention that these embodiments fit in a standard dairy crate. As shown in FIG. 6, a standard 4-gallon dairy crate 51 holds four 1-gallon containers 52 made in accordance with embodiments of this invention.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:
1. A blow-molded container comprising:
    a bottom member;
    a plurality of sidewalls including a first pair of opposing parallel sidewalls having a first width, a second pair of opposing parallel sidewalls having the first width, a third pair of opposing parallel sidewalls having a second width and a fourth pair of opposing parallel sidewalls having a third width;
a spout for receiving a closure cap;
a handle section proximate to the spout;
a sidewall upper limit defined by one or more sidewalls from the plurality of sidewalls; and
a curved transition that is formed between the sidewall upper limit and the spout, wherein the curved transition defines a curvature that extends continuously from the sidewall upper limit to the spout to provide a smooth transition between the sidewall upper limit and the spout.

2. The container of claim 1 further comprising said container having a weight of less than about 55 grams for a one gallon container.

3. The container of claim 1 further comprising said container having substantially uniform wall thickness.

4. The container of claim 1 further comprising a plurality of ribs molded into said curved transition.

5. The container of claim 1 further comprising a plurality of ribs molded into said bottom member.

6. The container of claim 1 further comprising a recess formed in said bottom member to facilitate stacking of the container with respect to an additional container.

7. The container of claim 1 further comprising a shape which fits in a standard dairy crate.

8. A blow-molded container comprising:
a bottom member;
a plurality of long sidewalls, each long sidewall of the plurality of long sidewalls being substantially planar, the plurality of long sidewalls including a first pair of opposing parallel sidewalls that is spaced apart by a first dimension, and a second pair of opposing parallel sidewalls that is spaced apart by the first dimension;
a plurality of short sidewalls, each short sidewall of the plurality of short sidewalls being substantially planar, the plurality of short sidewalls including a third pair of opposing parallel short sidewalls spaced apart by a second dimension that is different than the first dimension and a fourth pair of opposing parallel short sidewalls spaced apart by a third dimension that is different than the first dimension and the second dimension;
a spout for receiving a closure cap;
a handle section proximate to the spout;
a sidewall upper limit defined by one or more long sidewalls from the plurality of long sidewalls and one or more short sidewalls from the plurality of short sidewalls; and
a curved transition that is formed between the sidewall upper limit and the spout, wherein the curved transition defines a curvature that extends continuously from the sidewall upper limit to the spout to provide a smooth transition between the sidewall upper limit and the spout.

9. The blow-molded container of claim 8 wherein the handle section is adjacent to one of the short sidewalls from the third pair of opposing parallel short sidewalls.

10. The blow-molded container of claim 1, wherein the first width is larger than the second width and the second width is larger than the third width.

11. The blow-molded container of claim 10 wherein the handle section is adjacent to one of the sidewalls from the third pair of opposing parallel sidewalls.

12. The blow-molded container of claim 10, wherein the curved transition is adjacent to one of the sidewalls from the first pair of opposing parallel sidewalls, one of the sidewalls from the second pair of pair of opposing parallel sidewalls, and one of the sidewalls from the fourth pair of opposing parallel sidewalls.

13. The blow-molded container of claim 10, wherein the first pair of opposing parallel sidewalls are spaced by a first distance, the second pair of opposing parallel sidewalls are spaced by the first distance, the third pair of opposing parallel sidewalls are spaced by a second distance, and the fourth pair of opposing parallel sidewalls are spaced by a third distance.

14. The blow-molded container of claim 1, wherein the first pair of opposing parallel sidewalls are spaced by a first distance, the second pair of opposing parallel sidewalls are spaced by the first distance, the third pair of opposing parallel sidewalls are spaced by a second distance, and the fourth pair of opposing parallel sidewalls are spaced by a third distance.

15. A blow-molded container comprising:
a bottom member;
a plurality of sidewalls including a first pair of opposing parallel sidewalls having a first width, a second pair of opposing parallel sidewalls having the first width, a third pair of opposing parallel sidewalls having a second width and a fourth pair of opposing parallel sidewalls having a third width;
a spout portion configured for engagement with a closure cap;
a handle section proximate to the spout portion; and
a curved transition that is formed between one or more sidewalls from the plurality of sidewalls and the spout, wherein the curved transition defines a curvature that extends from the one or more sidewalls from the plurality of sidewalls to the spout to provide a smooth transition between the one or more sidewalls from the plurality of sidewalls and the spout.

16. The blow-molded container of claim 15, wherein the first width is larger than the second width and the second width is larger than the third width.

17. The blow-molded container of claim 16 wherein the handle section is adjacent to one of the sidewalls from the third pair of opposing parallel sidewalls.

18. The blow-molded container of claim 16, wherein the curved transition is adjacent to one of the sidewalls from the first pair of opposing parallel sidewalls, one of the sidewalls from the second pair of pair of opposing parallel sidewalls, and one of the sidewalls from the fourth pair of opposing parallel sidewalls.

19. The blow-molded container of claim 16, wherein the first pair of opposing parallel sidewalls are spaced by a first distance, the second pair of opposing parallel sidewalls are spaced by the first distance, the third pair of opposing parallel sidewalls are spaced by a second distance, and the fourth pair of opposing parallel sidewalls are spaced by a third distance.

20. The blow-molded container of claim 15, wherein the first pair of opposing parallel sidewalls are spaced by a first distance, the second pair of opposing parallel sidewalls are spaced by the first distance, the third pair of opposing parallel sidewalls are spaced by a second distance, and the fourth pair of opposing parallel sidewalls are spaced by a third distance.

* * * * *